United States Patent

George et al.

(10) Patent No.: US 9,845,109 B2
(45) Date of Patent: Dec. 19, 2017

(54) CONTINUOUS ESTIMATION OF SURFACE FRICTION COEFFICIENT BASED ON EPS AND VEHICLE MODELS

(71) Applicant: Steering Solutions IP Holding Corporation, Saginaw, MI (US)

(72) Inventors: Mariam Swetha George, Saginaw, MI (US); Shrenik P. Shah, Saginaw, MI (US); Farhad Bolourchi, Novi, MI (US); Tejas M. Varunjikar, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/077,591

(22) Filed: Mar. 22, 2016

(65) Prior Publication Data

US 2016/0280251 A1 Sep. 29, 2016

Related U.S. Application Data

(60) Provisional application No. 62/138,085, filed on Mar. 25, 2015.

(51) Int. Cl.
*B62D 6/00* (2006.01)
(52) U.S. Cl.
CPC .................... *B62D 6/006* (2013.01)
(58) Field of Classification Search
USPC .......................................... 701/41
See application file for complete search history.

(56) References Cited

U.S. PATENT DOCUMENTS

| 2002/0107621 A1* | 8/2002 | Byers ..................... B62D 6/002 701/41 |
| 2009/0078494 A1* | 3/2009 | Dornhege ............ B62D 5/0472 180/446 |
| 2009/0207043 A1* | 8/2009 | Shaffer .................. G08G 1/161 340/903 |
| 2010/0007200 A1* | 1/2010 | Pelosse .................... B60T 7/20 303/7 |
| 2012/0024038 A1* | 2/2012 | von Tardy-Tuch ..... B60T 8/172 73/9 |

(Continued)

FOREIGN PATENT DOCUMENTS

DE 102009002245 A1 10/2010

OTHER PUBLICATIONS

English Translation of German Office Action for German Patent Application No. 10 2016 105 498.4 dated Nov. 2, 2016, 6 pages.

(Continued)

*Primary Examiner* — Tyler Paige
(74) *Attorney, Agent, or Firm* — Cantor Colburn LLP (57) ABSTRACT

A system and a method of controlling a power steering system of a vehicle are provided. A control system includes a control module operable to determine a rack force of the vehicle based on at least one of a motor velocity, a driver torque and a motor torque, determine a plurality of modeled rack forces based on a roadwheel angle and a vehicle speed, compare the rack force to the plurality of modeled rack forces to generate a friction level included in a control signal, and send the control signal to the power steering system.

18 Claims, 5 Drawing Sheets

(56) References Cited

U.S. PATENT DOCUMENTS

| | | | | |
|---|---|---|---|---|
| 2012/0083972 | A1* | 4/2012 | Gruener | B62D 6/008 |
| | | | | 701/41 |
| 2012/0323474 | A1* | 12/2012 | Breed | B60W 30/04 |
| | | | | 701/117 |
| 2013/0226408 | A1* | 8/2013 | Fung | B60W 40/09 |
| | | | | 701/41 |
| 2014/0230533 | A1* | 8/2014 | Greul | B62D 15/0225 |
| | | | | 73/117.02 |
| 2015/0088380 | A1* | 3/2015 | Gabor | B60L 7/10 |
| | | | | 701/41 |
| 2016/0075371 | A1* | 3/2016 | Varunjikar | B62D 5/0463 |
| | | | | 701/43 |

OTHER PUBLICATIONS

German Office Action for German Patent Application No. 10 2016 105 498.4 dated Nov. 2, 2016, 6 pages.

* cited by examiner

CONTINUOUS ESTIMATION OF SURFACE FRICTION COEFFICIENT BASED ON EPS AND VEHICLE MODELS

CROSS-REFERENCES TO RELATED APPLICATIONS

This patent application claims priority to U.S. Provisional Patent Application Ser. No. 62/138,085, filed Mar. 25, 2015, which is incorporated herein by reference in its entirety.

BACKGROUND

Conventional methods of estimating road surface friction may use wheel slip computed from non-electric power steering (EPS) sensor signals. Different approaches for estimating a change in the road surface friction include use of differences in the wheel velocities and the wheel slip, use of vehicle yaw and lateral acceleration sensors, use of optical sensors at the front of a vehicle which use reflection from the road surface to estimate the road friction, use of acoustic sensors to detect tire noise which gives information about the surface, and use of sensors at the tire threads to measure stress and strain which may be referred back to a surface friction.

EPS sensor signals may also be used but detections are made after the steering wheel is in a steady state condition. As such, some subsets of driving maneuvers are excluded because of the steady state requirement. The detection algorithms applied in steady state conditions are binary, tri-state, etc., and limit information available to other vehicle subsystems.

In the case of friction determined based on wheel slip, determinations are costly and dependent on tire signals, or provide a late detection. It is important that the driver gets friction feedback, but friction information is also needed for other functions like EPS feel/torque synthesis, autonomous intelligent cruise control, and collision avoidance systems.

SUMMARY OF THE INVENTION

In one exemplary embodiment of the present invention, a control system for a power steering system of a vehicle is provided. The control system includes a control module operative to determine a rack force of the vehicle based on at least one of a motor velocity, a driver torque and a motor torque; determine a plurality of modeled rack forces based on a roadwheel angle and a vehicle speed; compare the rack force to the plurality of modeled rack forces to generate a friction level included in a control signal; and send the control signal to the power steering system.

In another exemplary embodiment of the present invention, a method of controlling a power steering system of a vehicle is provided. The method includes determining a rack force of the vehicle based on at least one of a motor velocity, a driver torque and a motor torque, determining a plurality of modeled rack forces based on a roadwheel angle and a vehicle speed; comparing the rack force to the plurality of modeled rack forces to generate a friction level included in a control signal; and sending the control signal to the power steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

In some embodiments, a method and a system use electric power steering (EPS) signals such as a handwheel angle (HWA) signal, a pinion torque (PT) signal, and a handwheel torque (HWT) signal to determine the tire-road friction (i.e., surface friction). As the system and the method of various embodiments of the invention detect a change in surface friction, the system and the method may be used to detect conditions where the vehicle might lose traction, and take appropriate preventive measures through an EPS system, an anti-lock braking system (ABS), and/or an electronic stability control (ESC) system.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
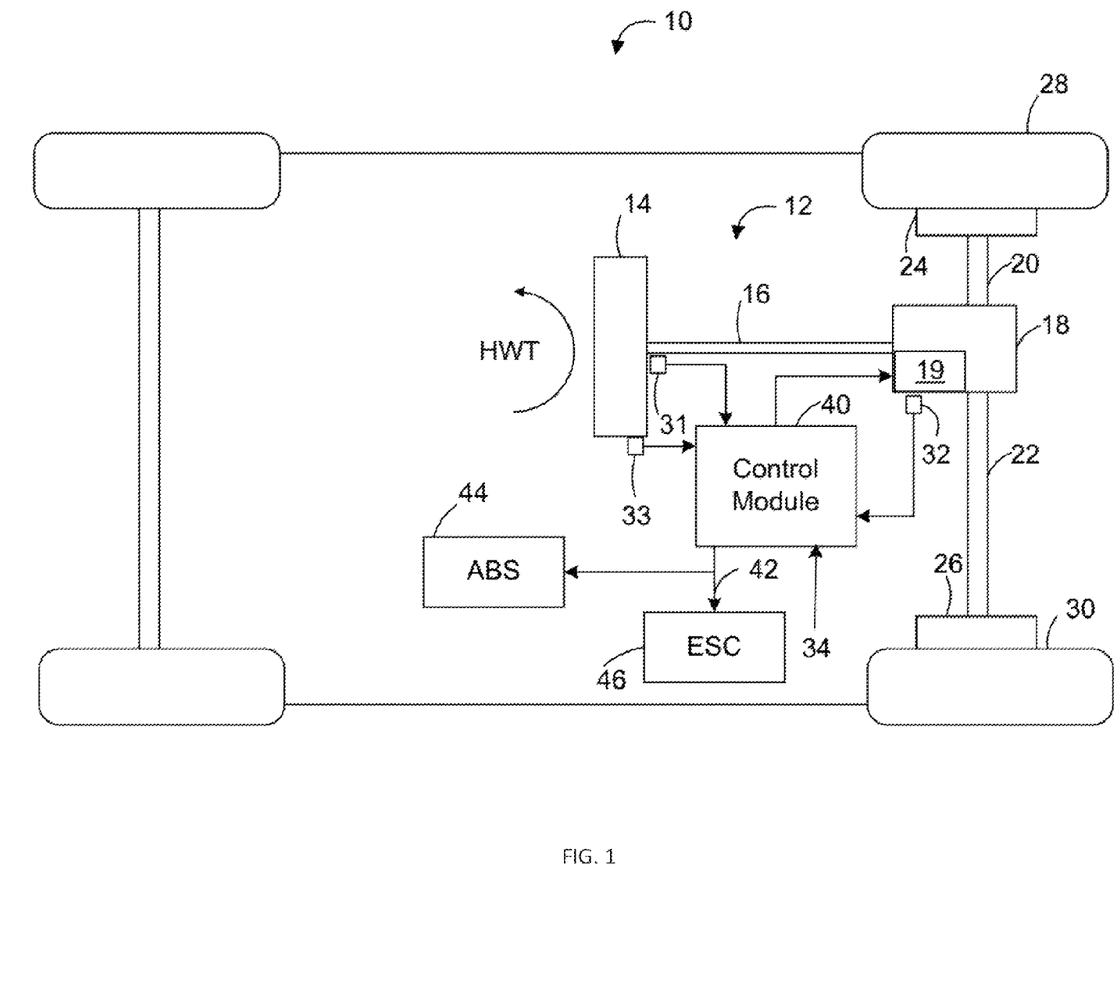
FIG. 1 is a functional block diagram illustrating a vehicle including a steering system in accordance with some embodiments.

Referring now to the Figures, where the invention will be described with reference to specific embodiments, without limiting same, FIG. 1 is an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 is an electric power steering (EPS) system that further includes a steering assist unit 18 that couples to the steering shaft system 16 of the steering system 12 and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as the handwheel 14 is turned by a vehicle operator, the steering actuator motor 19 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor speed sensor that senses a rotational speed of the steering actuator motor 19. The sensor 32 generates a motor speed or velocity signal based thereon. In yet another example, the sensor 33 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

Figure 2:
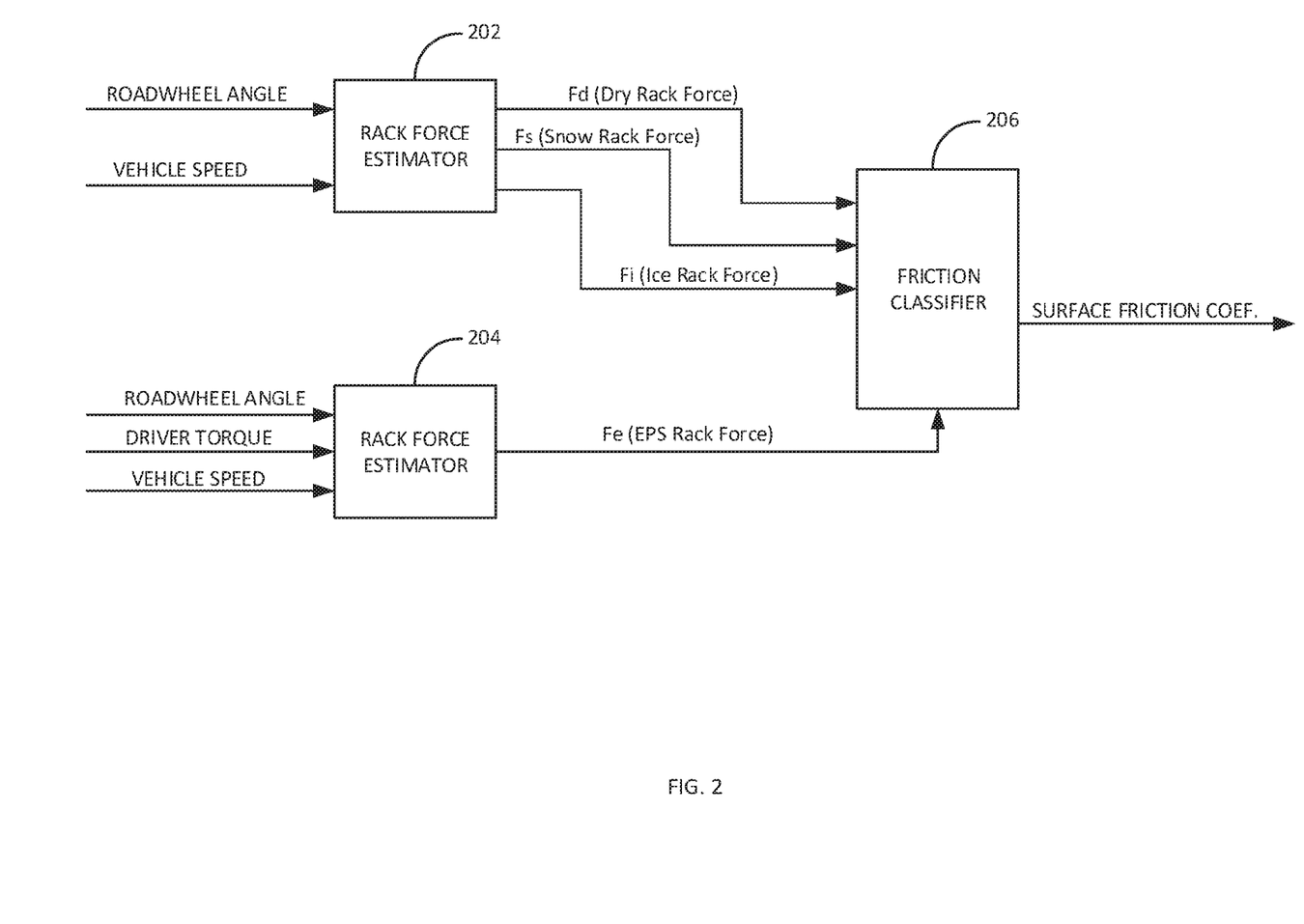
FIG. 2 illustrates a schematic diagram of a control module that detects a change in surface friction level using several electric power steering (EPS) signals in accordance with some embodiments.

FIG. 2 illustrates a schematic diagram of a friction control module 200 that represents a portion of the control logic within the control module 40 of FIG. 1 that determines a surface friction level using several EPS signals. In an embodiment, the friction control module 200 includes a Rack Force Estimation module 202, an EPS Observer module 204, and a Friction Classifier module 206. The Rack Force Estimation module 202 can estimate rack forces for different surfaces based on roadwheel angle and vehicle speed. Roadwheel angle may be derived from a HW angle from sensor 33 in some embodiments. The rack forces estimated by Rack Force Estimation module 202 can include a dry rack force that corresponds to a vehicle traveling on dry asphalt or another road-like surface, a snow rack force that corresponds to a vehicle traveling on a snow-covered surface, and an ice rack force that corresponds to a vehicle traveling on an ice-covered surface. Typical friction coefficients for the dry, snow and ice covered surfaces may be represented with surface friction coefficients (μ) represented by 1, 0.3, and 0.1, respectively. Although dry, snow and ice-covered surfaces are disclosed herein, it is further contemplated and understood that the Rack Force Estimation module 202 can estimate any number of different surfaces, including but not limited to those described above.

EPS Observer module 204 determines an actual rack force from one or more of motor torque, driver torque and motor velocity. The plurality of estimated rack forces and the actual rack force may be sent to the Friction Classifier module 206. The Friction Classifier module 206 determines a friction level based on a comparison of the actual rack force to the estimated rack forces. The friction level may be represented as a surface friction coefficient μnew; the friction level may be included in a control signal that is used to control the power steering system.

The EPS observer module 204 may be a disturbance observer that predicts steady state disturbance inputs to EPS system. An EPS system driver torque and motor torque can be considered as control inputs, while the rack force from the tie-rods acts as external disturbance input. Rack force is augmented as one of the states of the system, and a disturbance observer may then be created to estimate all the states of the system including the rack force. This can serve as estimation method for the rack force. In some embodiments, the disturbance observer equations are as follows:

$$\dot{\hat{X}} = A_{aug}\hat{X} + B_{aug}u + L(y - \hat{y})$$

$$\dot{\hat{X}} = A_{aug}\hat{X} + B_{aug}u + L(y - C_{aug}\hat{X})$$

$$\dot{\hat{X}} = (A_{aug} - LC_{aug})\hat{X} + B_{aug}u + Ly$$

$$\dot{\hat{X}} = (A_{aug} - LC_{aug})\hat{X} + [B_{aug} \quad L]\begin{bmatrix}u\\y\end{bmatrix},$$

where
$\hat{X}$ represents system states and an augmented state of disturbance input,
U represents control inputs including motor torque and driver torque,
Y represents system measurements such as motor position and motor velocity,
$A_{aug}$, $B_{aug}$, $C_{aug}$ are system matrices obtained from the equations of EPS system model,
L is an Obsever matrix obtained either by placing observer poles or by designing a kalman filter.

Sensor data, such as a HW angle from sensor 33 and HW torque sensor data from sensor 31 can be preprocessed to produce handwheel angle, handwheel torque and/or driver torque, as well as derivative/delta values, and/or handwheel and vehicle speed.

Each of the modules 202, 204, and 206 can be implemented as non-transitory executable instructions in memory of the friction control module 200 or formed in hardware and may be executed by one or more processing circuits of the friction control module 200. The outputs of the Rack Force Estimation module 202, EPS Observer module 204, and the Friction Classifier module 206 are used to estimate surface friction levels as will be described in more details further below by reference to FIGS. 3-5.

Figure 3:
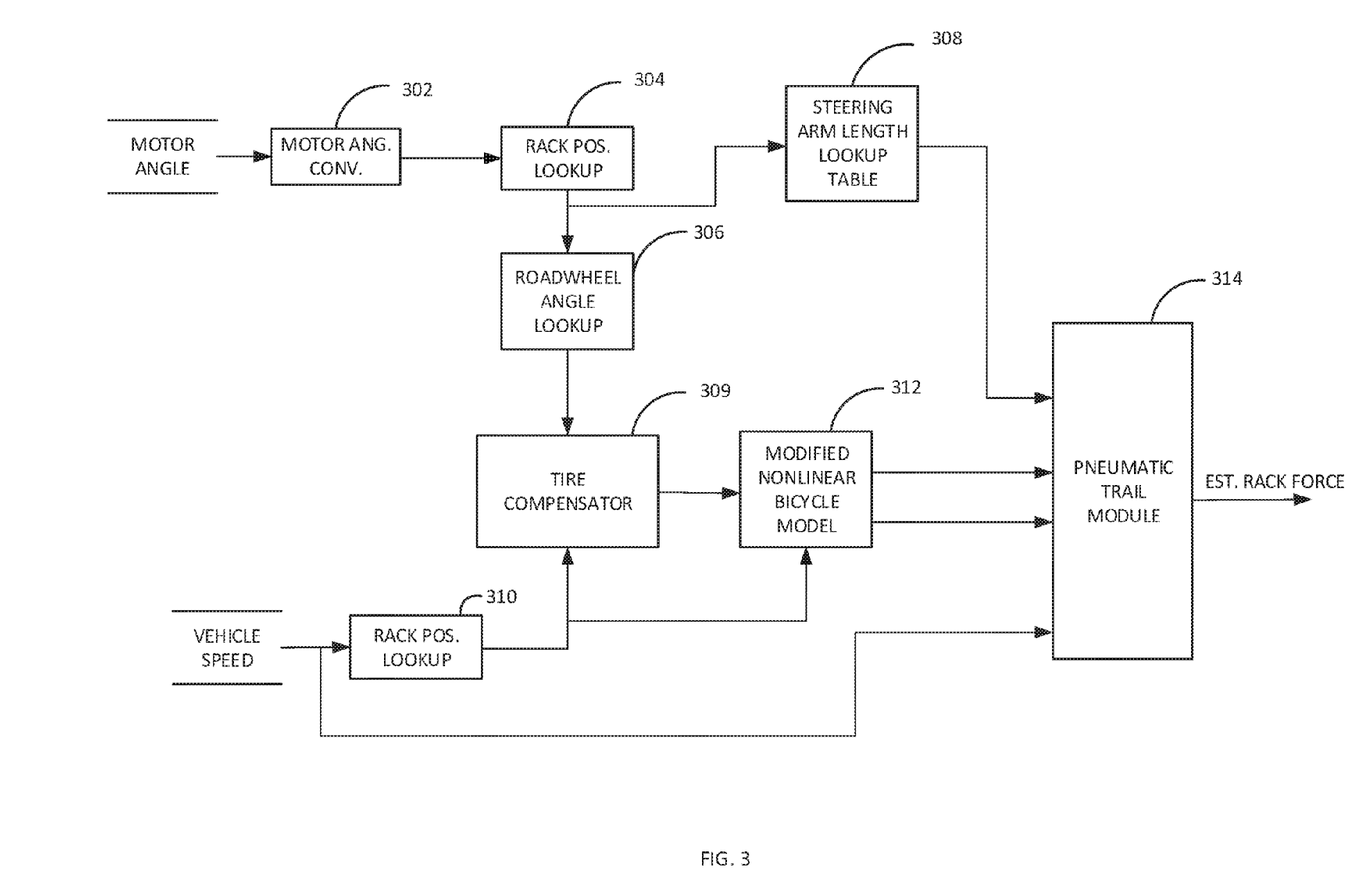
FIG. 3 illustrates a schematic diagram of a Vehicle Modeling module that generates rack force estimates according to some embodiments.

FIG. 3 illustrates a schematic diagram of the Vehicle Modeling module 202 of FIG. 2. At motor angle conversion block 302, motor angle may be received as degrees and converted to radians, to represent units consistent with roadwheel angle. The representation of the motor angle in radians may be sent by the motor angle conversion block 302 to Rack Position Lookup block 304. Rack Position Lookup block 304 determines a rack position from the motor angle expressed in radians. The rack position is sent to a Roadwheel Angle Lookup block 306 that determines a roadwheel angle from the rack position. The roadwheel angle is expressed in radians in some embodiments.

The rack position may be sent to a Steering Arm Length Lookup block 308 that determines a steer arm length from rack position. Rack Position Lookup block 304, Roadwheel Angle Lookup block 306, and Steering Arm Length Lookup block 308 may use lookup tables to generate their respective outputs.

The Roadwheel Angle Lookup block 306 sends the roadwheel angle to a Tire Compensator module 309. The Tire Compensator module 309 may also receive a magnitude of the vehicle speed that has been converted to meters per second at Speed Conversion block 310. The Tire Compensator module 309 generates an Adjusted Tire Angle from the roadwheel angle. The Adjusted Tire Angle and the vehicle speed sent by Speed Conversion block 310 are processed by the Modified Nonlinear Bicycle Model module 312.

The Modified Nonlinear Bicycle Model module 312 generates a Front Axle Force which may be expressed in Newtons, and a Front Axle Slip Angle which may be expressed in radians. A Pneumatic Trail Module 314 determines the Rack Force as a function of Steer Arm Length, Front Axle Force, Front Axle Slip Angle and vehicle speed magnitude. Rack Force is transmitted by the Rack Force Estimation module 202 to the Friction Classifier module 206. The Rack Force Estimation module 202 may estimate rack force for a plurality of different surfaces including but not limited to dry, ice, and snow covered surfaces. The Rack Force Estimation module 202 may individually estimate each rack force for each surface and simultaneously transmit the rack force estimates to the Friction Classifier module 206.

The Rack Force Estimation module 202 may use the following equations to estimate rack force for any number of given surfaces. These equations include:

$$m.(\dot{V} + r.U) = F_{cf} + F_{cr} \text{ (Lateral Dynamics)}$$

$$I_{zz}\dot{r} = a.F_{cf} - b.F_{cr} \text{ (Yaw Dynamics)}$$

$$F_{rack} = (t_m + t_p).\frac{F_{cf}}{SA} \text{ (Rack Force)}$$

$$\alpha_f = \frac{V + a.r}{U} - \delta_{lagged}$$

$$\alpha_r = \frac{V - b.r}{U},$$

where m is Mass of the vehicle, $I_{zz}$ is Y inertia of the vehicle, SA is steer arm length, a is vehicle CG to Front Axle Distance, b is Vehicle CG to rear axle distance, r is yaw rate, U is longitudinal speed, V is lateral speed, $F_{cf}$ is front axle force, $F_{cr}$ is rear axle force, $\alpha_f$ is front axle slip angle, $\alpha_r$ is rear axle slip angle, $t_m$ is mechanical trail, $t_p$ is pneumatic trail, $\delta_{lagged}$ is tire angle with lag, and $\theta$ is motor angle.

Figure 4:
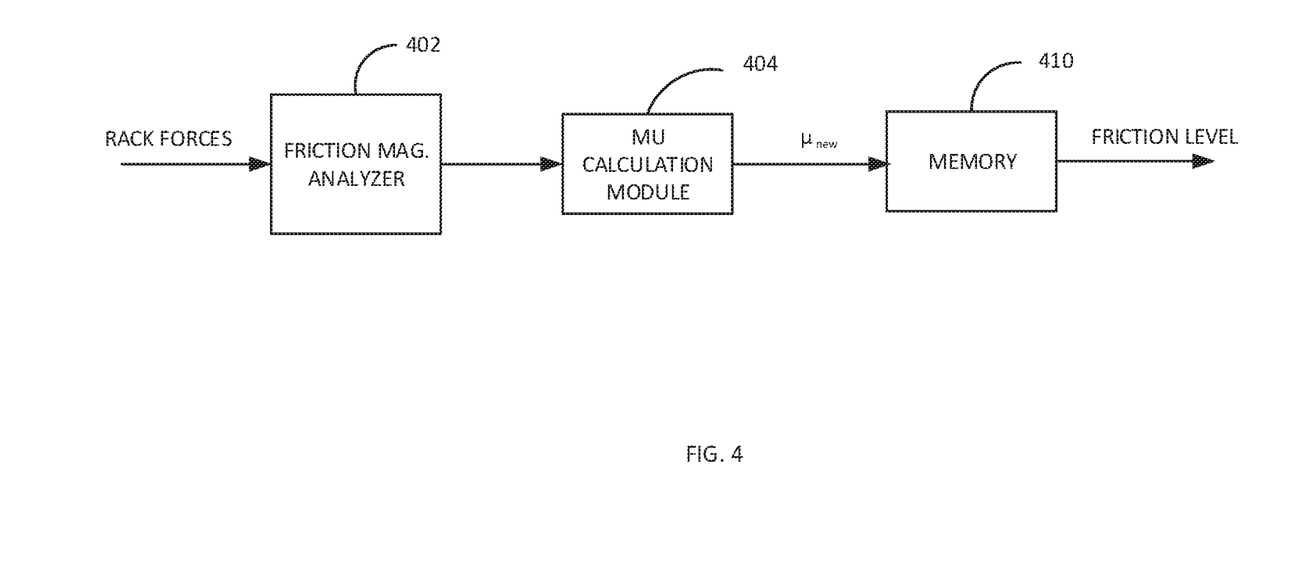
FIG. 4 illustrates a schematic diagram of a friction classifier of the control module according to some embodiments.

FIG. 4 is a schematic diagram of the Friction Classifier module in more detail. At Friction Magnitude Analyzer 402, the actual rack force and the plurality of estimated rack forces are analyzed to determine whether conditions are suitable for updating a friction coefficient. For example, if a vehicle is travelling in a straight or semi-straight path, steering input is not provided to the EPS system and the friction level is not able to determined. The Friction Magnitude Analyzer 402 may update a friction coefficient using any number of estimated rack forces determined by the Rack Force Estimation module 202 (FIG. 2). In the embodiment described in FIG. 4, ice rack force (Fi), the snow rack force ($F_s$), and dry rack force ($F_d$) are estimated and provided to the Friction Magnitude Analyzer 402.

When the Friction Magnitude Analyzer 402 determines that actual rack force falls between Fs and Fd, or any other estimated rack force values, Mu Calculation module 404 outputs a $\mu_{new}$ value that is calculated based on the estimated rack force ($F_e$), the snow rack force ($F_s$), dry rack force ($F_d$), snow friction coefficient ($\mu_s$) and dry surface friction coefficient ($\mu_d$). In some embodiments, $\mu_{new}$ is calculated by solving the following equation when actual rack force falls between $F_s$ and $F_d$:

$$\frac{\mu_{new} - \mu_s}{\mu_d - \mu_s} = \frac{F_e - F_s}{F_d - F_s}$$

In this embodiment, the Friction Magnitude Analyzer 402 determines that rack force estimate falls between $F_i$ and $F_s$, the Mu Calculation module 404 outputs a $\mu_{new}$ value that is calculated based on the estimated rack force ($F_e$), the snow rack force ($F_s$), ice rack force (Fi), snow friction coefficient ($\mu_s$) and ice surface friction coefficient ($\mu_i$). In this situation, $\mu_{new}$ is calculated by solving the following equation:

$$\frac{\mu_{new} - \mu_i}{\mu_s - \mu_i} = \frac{F_e - F_i}{F_s - F_i}$$

Once calculated, $\mu_{new}$ may be loaded in memory 410, and the power steering system may be updated with a friction level that includes $\mu_{new}$.

The double interpolation illustrated in FIG. 4 provides more resolution over a single interpolation that takes into account a surface with a maximum friction coefficient (e.g. dry surface) and a minimum surface coefficient (e.g. slippery surface). This is because, in part, an average of surface coefficients for multiple surfaces is not a mathematical average of $\mu_d$ and $\mu_i$.

Once a vehicle detects a change in surface friction, other vehicles can be alerted. As a result, the other vehicles could pre-charge their brakes (to be able to exert a more effective braking force), adjust their speeds for the road conditions, etc. The situation may arise under limited visual conditions (fog or darkness) such that the exact condition of the road friction may not be obvious to the driver. Driverless vehicles of the future may also find such information desirable.

Figure 5:
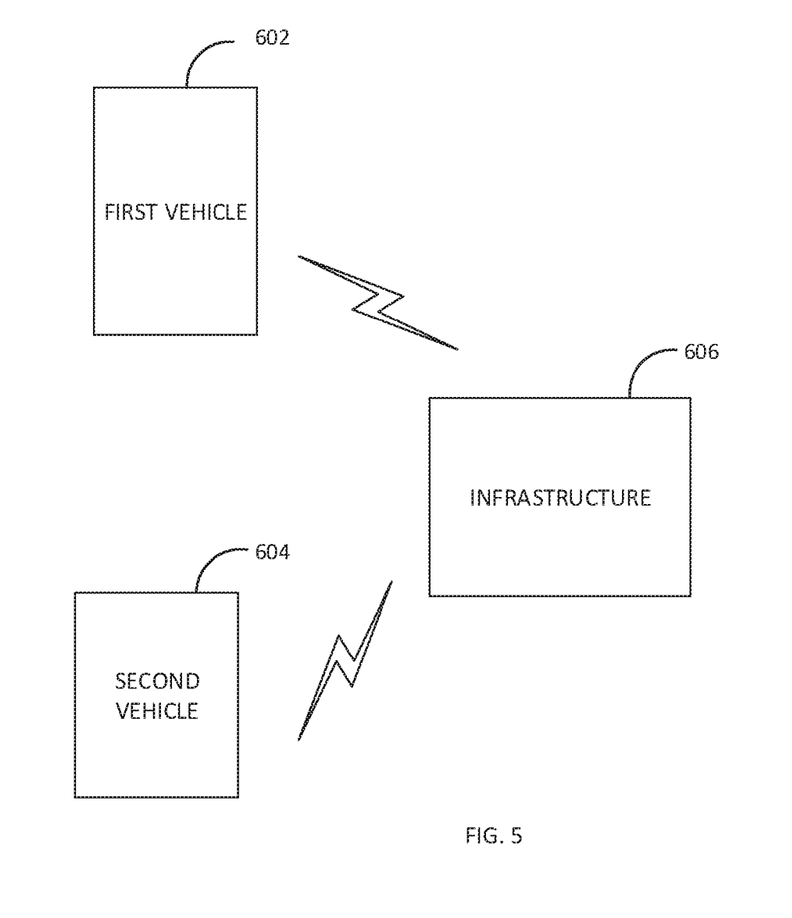
FIG. 5 illustrates a wireless data transmission application of the classified friction level according to some embodiments.

FIG. 5 illustrates an implementation of a wireless broadcasting of the friction coefficient between vehicles 602, 604 and/or infrastructure 606. Specifically, a first vehicle 602 and second vehicle 604 may include wireless transceivers to enable transmission between vehicles and/or infrastructure 606 using Dedicated Short-Range Communications (DSRC) architecture, for example. If vehicle 1 is making a left turn in an intersection, vehicle 1 may broadcast the friction level information (regarding μ to vehicle 2. The information may also be passed to infrastructure (for example mounted on a traffic light). One advantage of communicating to infrastructure is that the information can be broadcasted with more energy/fidelity to all vehicles nearby or to larger broadcasting (media, etc.).

While the invention has been described in detail in connection with only a limited number of embodiments, it should be readily understood that the invention is not limited to such disclosed embodiments. Rather, the invention may be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A control system for a power steering system of a vehicle, comprising:
a control module operable to receive sensor data and control the power steering system, the control module configured to:
determine a first rack force of the vehicle based on a motor velocity, a driver torque and a motor torque;
determine a plurality of second modeled rack forces based on a roadwheel angle and a vehicle speed;
compare the first rack force to the plurality of second modeled rack forces to generate a friction level; and
send a control signal indicative of the friction level to the power steering system to provide operator feedback corresponding to the friction level.

2. The control system of claim 1, wherein the control module is further configured to determine the first rack force of the vehicle based on an estimate obtained by an electric power steering system observer.

3. The control system of claim 1, wherein the control module is further configured to check magnitudes of the first rack force and the plurality of second modeled rack forces to determine whether to update the friction level.

4. The control system of claim 1, wherein the plurality of second modeled rack forces include a snow rack force, a dry rack force, and an ice rack force, wherein when the first rack force falls between the snow rack force and dry rack force, the friction level is determined based on the snow rack force subtracted from at least the dry rack force.

5. The control system of claim 1, wherein the plurality of second modeled rack forces include a snow rack force, a dry rack force, and an ice rack force, wherein when the first rack force falls between the snow rack force and ice rack force, the friction level is determined based on the snow rack force subtracted from at least the ice rack force.

6. The control system of claim 1, wherein the friction level can be wirelessly broadcast to a second vehicle over a dedicated short-range communications (DSRC) architecture.

7. A method of controlling a power steering system of a vehicle, the method comprising:
determining, by a control module, a first rack force of the vehicle based on at least one of a motor velocity, a driver torque and a motor torque;
determining, by the control module, a plurality of second modeled rack forces based on a roadwheel angle and a vehicle speed;
comparing, by the control module, the first rack force to the plurality of second modeled rack forces to generate a friction level; and
sending, by the control module, a control signal indicative of the friction level to the power steering system for providing friction feedback to an operator.

8. The method of claim 7, further comprising determining the first rack force of the vehicle based on an estimate obtained by an electric power steering system observer.

9. The method of claim 7, further comprising checking magnitudes of the first rack force and the plurality of second modeled rack forces to determine whether to update the friction level.

10. The method of claim 7, wherein the plurality of second modeled rack forces include a snow rack force, a dry rack force, and an ice rack force, wherein when the first rack force falls between the snow rack force and dry rack force, the friction level is determined based on the snow rack force subtracted from at least the dry rack force.

11. The method of claim 7, wherein the plurality of second modeled rack forces include a snow rack force, a dry rack force, and an ice rack force, wherein when the first rack force falls between the snow rack force and ice rack force, the friction level is determined based on the snow rack force subtracted from at least the ice rack force.

12. The method of claim 7, wherein the friction level can be wirelessly broadcast to a second vehicle over a dedicated short-range communications (DSRC) architecture.

13. A non-transitory computer readable medium having stored thereon instructions for executing a method of controlling a power steering system of a vehicle, the method comprising:
determining a first rack force of the vehicle based on at least one of a motor velocity, a driver torque and a motor torque;
determining a plurality of second modeled rack forces based on a roadwheel angle and a vehicle speed;
comparing the first rack force to the plurality of second modeled rack forces to generate a friction level; and
sending a control signal indicative of the friction level to the power steering system to adjust power steering operation corresponding to the friction level.

14. The non-transitory computer readable medium of claim 13, the method further comprising determining the first rack force of the vehicle based on an estimate obtained by an electric power steering system observer.

15. The non-transitory computer readable medium of claim 13, the method further comprising checking magnitudes of the first rack force and the plurality of modeled second rack forces to determine whether to update the friction level.

16. The non-transitory computer readable medium of claim 13, wherein the plurality of modeled second rack forces include a snow rack force, a dry rack force, and an ice rack force, wherein when the first rack force falls between the snow rack force and dry rack force, the friction level is determined based on the snow rack force subtracted from at least the dry rack force.

17. The non-transitory computer readable medium of claim 13, wherein the plurality of modeled second rack forces include a snow rack force, a dry rack force, and an ice rack force, wherein when the first rack force falls between the snow rack force and ice rack force, the friction level is determined based on the snow rack force subtracted from at least the ice rack force.

18. The non-transitory computer readable medium of claim 13, wherein the friction level can be wirelessly broadcast to a second vehicle over a dedicated short-range communications (DSRC) architecture.

* * * * *